(12) United States Patent
 Bachmann et al.

(10) Patent No.: US 9,121,394 B2
(45) Date of Patent: Sep. 1, 2015

(54) ENERGY HARVESTER FOR CONVERTING VIBRATIONAL MOTION OF A VIBRATING EQUIPMENT INTO ELECTRICAL ENERGY, AND A DEVICE FOR MONITORING THE OPERATION OF A VIBRATING EQUIPMENT

(71) Applicant: Metso Minerals Industries, Inc., Waukesha, WI (US)

(72) Inventors: Jan F. Bachmann, Karlsruhe (DE); Eugen Kramlich, Pforzheim (DE); Helge B. Wurst, Karlsruhe (DE); Kami Parker, Hooper, UT (US); Scott Snyder, McMurray, PA (US)

(73) Assignee: Metso Minerals Industries, Inc., Waukesha, WI (US)

( * ) Notice: Subject to any disclaimer, the term of this patent is extended or adjusted under 35 U.S.C. 154(b) by 0 days.

(21) Appl. No.: 13/856,675

(22) Filed: Apr. 4, 2013

(65) Prior Publication Data
US 2014/0300113 A1 Oct. 9, 2014

(51) Int. Cl.
| F02B 63/04 | (2006.01) |
| F03G 7/08 | (2006.01) |
| H02K 7/18 | (2006.01) |
| H02N 2/18 | (2006.01) |
| F03B 13/10 | (2006.01) |
| F03B 13/12 | (2006.01) |

(52) U.S. Cl.
CPC ............... *F03G 7/08* (2013.01); *H02K 7/1892* (2013.01); *H02N 2/186* (2013.01)

(58) Field of Classification Search
USPC ............... 290/1 R, 42, 53; 320/101; 417/233
See application file for complete search history.

(56) References Cited

U.S. PATENT DOCUMENTS

| 3,011,062 | A | * | 11/1961 | Goldsmith | 290/53 |
| 3,231,749 | A | * | 1/1966 | Hinck, III | 290/53 |
| 3,937,002 | A | * | 2/1976 | Van Haaften | 368/225 |
| 4,110,630 | A | * | 8/1978 | Hendel | 290/53 |
| 4,260,901 | A | * | 4/1981 | Woodbridge | 290/42 |
| 4,317,047 | A | * | 2/1982 | de Almada | 290/53 |
| 4,423,334 | A | * | 12/1983 | Jacobi et al. | 290/53 |
| 4,580,400 | A | * | 4/1986 | Watabe et al. | 60/398 |
| 4,619,349 | A | * | 10/1986 | Braun | 188/380 |
| 4,761,577 | A | * | 8/1988 | Thomas et al. | 310/67 A |
| 4,852,350 | A | * | 8/1989 | Krisko | 60/325 |

(Continued)

FOREIGN PATENT DOCUMENTS

| EP | 2 221 954 A1 | 8/2010 |
| WO | 2007/096615 A1 | 8/2007 |
| WO | 2010/033012 A2 | 3/2010 |

OTHER PUBLICATIONS

Int'l. Search Report dated Jul. 1, 2014.

*Primary Examiner* — Pedro J Cuevas
(74) *Attorney, Agent, or Firm* — Andrus Intellectual Property Law, LLP

(57) ABSTRACT

The invention relates to an energy harvester for converting vibrational motion of a vibrating equipment into electrical energy. The energy harvester comprises a pendulum arranged to be pivotably attached to said vibrating equipment, a motion limiter arranged to limit a pivoting motion of said pendulum, and a generator connected to said pendulum and arranged to convert said pivoting motion into electrical energy. The vibrational motion has an operating frequency, and said pendulum has a natural frequency different from said operating frequency. The invention also relates to a device for monitoring the operation of a vibrating equipment.

11 Claims, 2 Drawing Sheets

(56) References Cited

U.S. PATENT DOCUMENTS

| | | | |
|---|---|---|---|
| 4,866,564 A * | 9/1989 | Aoki | 361/203 |
| 5,707,215 A * | 1/1998 | Olney et al. | 417/233 |
| 5,908,122 A * | 6/1999 | Robinett et al. | 212/275 |
| 5,934,882 A * | 8/1999 | Olney et al. | 417/233 |
| 5,941,692 A * | 8/1999 | Olney et al. | 417/233 |
| 5,947,696 A * | 9/1999 | Baumgarten | 417/233 |
| 6,704,001 B1 * | 3/2004 | Schena et al. | 345/161 |
| 6,737,829 B2 * | 5/2004 | Sastry | 320/101 |
| 6,984,902 B1 | 1/2006 | Huang et al. | 310/26 |
| 7,105,939 B2 * | 9/2006 | Bednyak | 290/42 |
| 7,239,038 B1 * | 7/2007 | Zimmerman et al. | 290/54 |
| 7,372,178 B2 * | 5/2008 | Ahmed et al. | 310/12.25 |
| 7,375,436 B1 * | 5/2008 | Goldin | 290/42 |
| 7,453,165 B2 * | 11/2008 | Hench | 290/53 |
| 7,629,700 B2 * | 12/2009 | Begley et al. | 290/1 R |
| 7,629,704 B2 * | 12/2009 | Hench | 290/53 |
| 7,737,569 B2 * | 6/2010 | Hench | 290/42 |
| 7,759,813 B2 * | 7/2010 | Fujisato | 290/53 |
| 7,839,058 B1 | 11/2010 | Churchill et al. | 310/339 |
| 7,989,975 B2 * | 8/2011 | Clement et al. | 290/53 |
| 8,004,104 B2 * | 8/2011 | Hench | 290/53 |
| 8,026,620 B2 * | 9/2011 | Hobdy | 290/42 |
| 8,046,108 B2 * | 10/2011 | Hench | 700/286 |
| 8,102,065 B2 * | 1/2012 | Hobdy | 290/1 R |
| 8,166,810 B2 * | 5/2012 | Chen et al. | 73/146.4 |
| 8,223,003 B2 * | 7/2012 | Chang et al. | 340/432 |
| 8,269,365 B2 * | 9/2012 | Clement et al. | 290/53 |
| 8,299,659 B1 * | 10/2012 | Bartol, Jr. | 310/36 |
| 8,476,778 B2 * | 7/2013 | Weinberger et al. | 290/42 |
| 8,519,557 B2 * | 8/2013 | Beane | 290/53 |
| 8,836,152 B2 * | 9/2014 | Hobdy | 290/42 |
| 8,907,513 B2 * | 12/2014 | Hobdy | 290/53 |
| 2003/0137274 A1 * | 7/2003 | Sastry | 320/101 |
| 2005/0001113 A1 * | 1/2005 | Sullivan et al. | 248/127 |
| 2005/0088310 A1 | 4/2005 | Sakai | 310/339 |
| 2006/0163951 A1 * | 7/2006 | Ahmed et al. | 310/12 |
| 2007/0114890 A1 | 5/2007 | Churchill et al. | 340/693.2 |
| 2009/0008942 A1 * | 1/2009 | Clement et al. | 290/53 |
| 2009/0160191 A1 * | 6/2009 | Beane | 290/53 |
| 2010/0032946 A1 * | 2/2010 | Begley et al. | 290/3 |
| 2010/0083746 A1 | 4/2010 | Chen et al. | 73/146.4 |
| 2010/0123313 A1 * | 5/2010 | Hobdy | 290/42 |
| 2011/0285128 A1 * | 11/2011 | Hobdy | 290/42 |
| 2012/0139262 A1 * | 6/2012 | Begley et al. | 290/1 R |
| 2013/0341921 A1 * | 12/2013 | Beane | 290/42 |
| 2015/0054285 A1 * | 2/2015 | Hobdy | 290/53 |

* cited by examiner

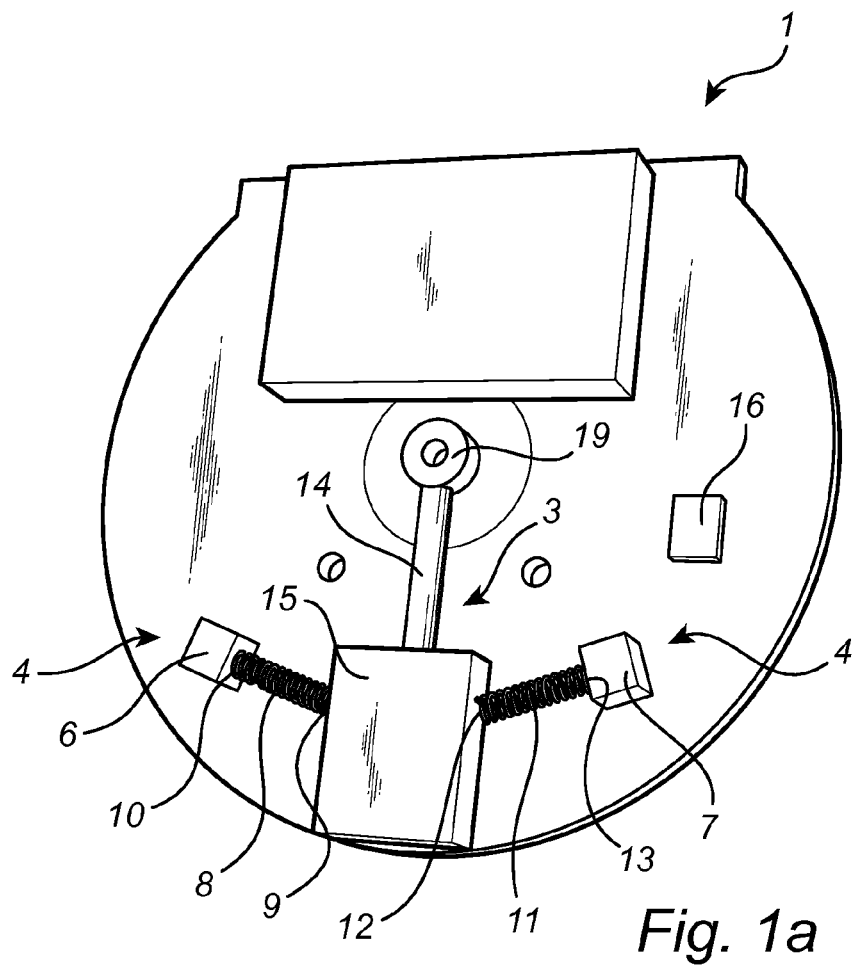
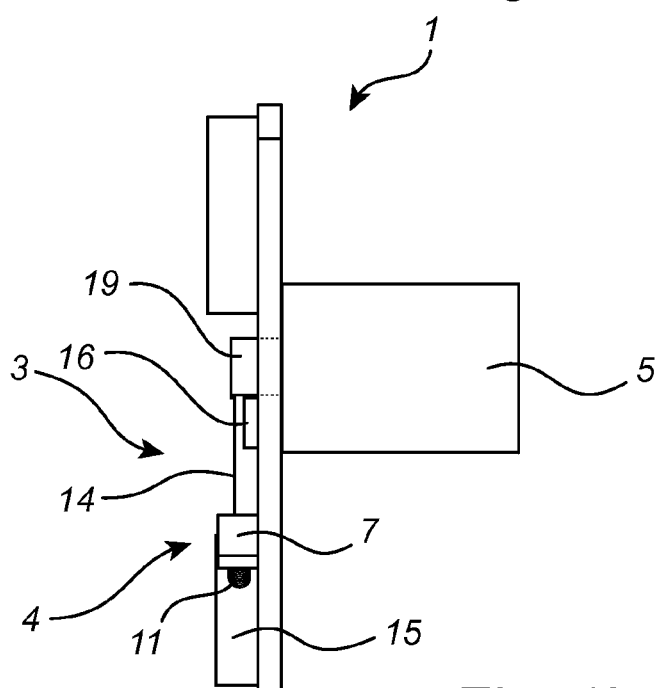

ENERGY HARVESTER FOR CONVERTING VIBRATIONAL MOTION OF A VIBRATING EQUIPMENT INTO ELECTRICAL ENERGY, AND A DEVICE FOR MONITORING THE OPERATION OF A VIBRATING EQUIPMENT

TECHNICAL FIELD

The present invention relates to an energy harvester for converting vibrational motion of a vibrating equipment into electrical energy. The invention also relates to a device for monitoring the operation of a screen.

BACKGROUND

Proper operation of large screens for bulk products is essential for a cost efficient operation. A screen breakdown causes production loss and requires extensive repair. Therefore continuous monitoring of the screen operation is important to schedule preventive maintenance.

Under proper conditions, the movement of a screen is uniform from left to right sides. A good way to monitor the proper operation of a screen is therefore the installation of sensors at characteristic screen locations to measure and compare the three-dimensional movements of the screen continuously.

Screens can operate. with accelerations of up to 7 g, at frequencies of up to 25 Hz (1500 RPM) and can have amplitudes exceeding ¾" (19.05 mm). This causes problems for the sensors, since standard sensors need to be connected to the data acquisition system with a cable containing typically 4 cores. This cable undergoes high repetitive flexing stress at the point where it is linked to the moving screen, which causes the cores to break quickly over time. Further. the sensors need to be connected to a power source, which also implies vulnerable cables. Accordingly, a method of powering devices located on the vibrating screen body is clearly needed to avoid that type of cabling. One possible solution to this problem is the use of an energy harvester. The purpose of the energy harvester is to convert the inherent movement of the vibrating screen into electrical energy in order to power electronic devices on or near vibrating screen bodies.

Energy harvesters which produce energy from vibrations are well described in the technical literature. WO 2010/0083746, for example, discloses an energy harvester to work with a swinging apparatus and a coil to generate an induced current for power generation during the swing of the swung mechanism. The natural frequency of the swing mechanism may be adjusted according to the rotational velocity of the energy provider.

There are, however, problems associated with the above technique and other prior art when used with vibrating equipment. Typical energy harvesters work best at or around one of their natural frequencies while the performance is significantly reduced or stopped as soon as the frequency deviates from these frequencies. If a resonant type energy harvester were to operate at the characteristic acceleration level of vibration equipment and feeders (3-7 g), the device would fail quickly or require extensive mechanical precautions to avoid destruction. Thus, energy harvesters available on the market are not capable of withstanding the high acceleration present or do not feature a suitably large operating bandwidth to accommodate the characteristics of vibrating equipment. Owing to the low acceleration applications, available energy harvesters are also not designed to supply large amounts of power.

SUMMARY

It is an object of the present invention to provide an improvement of the above technique and prior art. More particularly, it is an object of the present invention to provide an energy harvester that effectively can convert the vibrational motion of vibrating equipment into electrical energy. Further, it is an object of the present invention to provide a device for monitoring the operation of a vibrating equipment.

These and other objectives, and/or advantages that will be apparent from the following description of embodiments, are achieved, in full or at least in part, by an energy harvester for converting vibrational motion of a vibrating equipment into electrical energy. The energy harvester comprises a pendulum arranged to be pivotably attached to the vibrating equipment, a motion limiter arranged to limit a pivoting motion of the pendulum, and a generator connected to the pendulum and arranged to convert the pivoting motion into electrical energy. Unlike prior art, the pendulum has a natural frequency different from the operating frequency of the vibrating equipment. The energy harvester will be forced to work at or near the operating frequency of the vibrating equipment by using a pendulum with a natural frequency independent of the operating frequency of the vibrating equipment together with a motion limiter arranged to limit the pivoting motion of the pendulum. The pendulum will start to pivot from the movement of the vibrating equipment and bounce off the motion limiter, thereby restricting its movement without inducing strong energy dissipation. Thus, the pendulum will have a frequency which corresponds to the operating frequency of the vibrating equipment and will differ from the natural frequency of the pendulum. Accordingly, there is no need for adjustment of the pendulum when the frequency of the vibrating equipment changes. The energy harvester may in turn be used to provide sensors on the vibrating equipment with electrical energy. Thus, the requirement of connection cables can be avoided h using wireless sensors which communicate with the controller using radio transmission techniques. This way there will he no need for data transmission lines. Another advantage achieved from the energy harvester is that it will work satisfactorily even at low frequencies.

The energy harvester may further comprise at least one spring element having a first and a second end, the first end being attached to the pendulum and the second end being arranged to rebound against the motion limiter. The spring element may be used to at least partly help controlling the movement, and thus the frequency, of the pendulum.

The motion limiter may comprise a first bar element provided on one side of the pendulum and a second bar element provided on the other side of the pendulum. In addition, the energy harvester may further comprise a first spring element having a first and a second end, the first end being attached to the pendulum and the second end being arranged to rebound against the first bar element, and a second spring element having a first and a second end, the first end being attached to the pendulum and the second end being arranged to rebound against the second bar element. This embodiment allows efficient control of the frequency of the pendulum of the energy harvester.

The generator may be a step drive, which is a conventional device and simple to use. The generator may also be a linear actuator. With a linear actuator there is no need to transform the linear screen movement into a rotation.

The natural frequency of the pendulum may be significantly higher or lower than the operating frequency. A light pendulum is chosen to ensure a natural frequency which is different from the operating frequency of the vibrating equipment. This way, the pivoting motion of the pendulum will always be sufficient and may, if necessary, be angularly adjusted in relation to the vibrating equipment using the motion limiter and possibly the spring element.

The pendulum may comprise a rod attached to a shaft, and a weight provided at an end of the rod. This is a simple cost efficient embodiment of the invention.

The energy harvester may be a high g energy harvester which generally operates between 3 and 7 g and has a characteristic peak to peak movement of 0.2" to 0.8".

The vibrating equipment may be a screen of a feeder. Vibrating screens and feeders move slower and have a higher peak-to-peak movement than the known energy harvesters are capable of withstanding and operating under. The energy harvester of the present invention. is particularly suitable for use with a vibrating screen or a feeder and is capable of withstanding and using characteristically large peak-to-peak movements of 0.2" to 0.8" to produce energy.

The energy harvester may further comprise a microcontroller for monitoring the operating condition of the energy harvester. This way, the energy harvester may be monitored automatically without much effort from a user.

The pendulum may be arranged to move parallel with said vibrational motion of said vibrating equipment. This way, the angular peak-to-peak movement of the pendulum is parallel to the angular peak-to-peak movement of the vibrating equipment.

According to a second aspect of the invention, the invention relates to a device for monitoring the operation of a vibrating equipment. The device comprises a sensor for detecting a parameter of the vibrating equipment, and an energy harvester according to the above described features. The energy harvester provides the sensor with electrical energy. The energy harvester may be adjustable in relation to a movement of the vibrating equipment.

Generally, all terms used in the claims are to be interpreted according to their ordinary meaning in the technical field, unless explicitly defined otherwise herein. All references to "a/an/the [element, device, component, means, etc.]" are to be interpreted openly as referring to at least one instance of said element, device, component, means, etc., unless explicitly stated otherwise.

As used herein, the term "comprising" and variations of that term are not intended to exclude other additives, components, integers or steps.

The term "vibrating equipment" includes any equipment which may produce any type of vibrations, such as, for example, screens, crushers, and mills.

The term "vibrational motion" includes any type of vibrational movement but generally refers to a reciprocating or repetitive motion.

By "natural frequency" of the pendulum it is meant the natural frequency in an uninfluenced state. That is to say, in a state in which the pendulum is not affected by any outer forces, such as, for example, the spring elements presented in the application or the like.

Various other features, objects and advantages of the invention will be made apparent from the following description taken together with the drawings.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein:

FIG. 1a is a perspective view of an exemplary embodiment of an energy harvester for converting vibrational motion of a vibrating equipment into electrical energy;

FIG. 1b is a side view of the energy harvester in FIG. 1a; and

DETAILED DESCRIPTION

Figure 2:
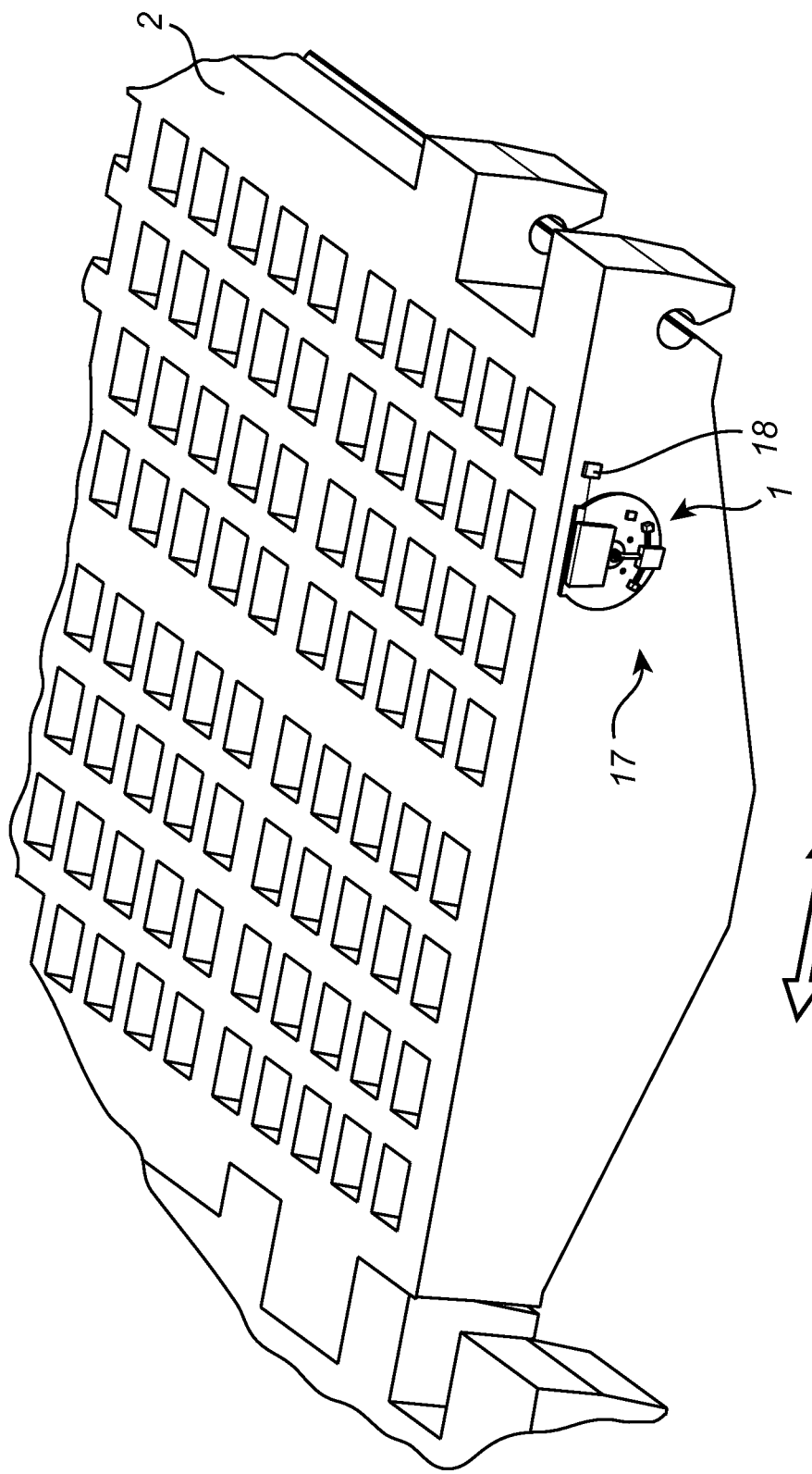
FIG. 2 is a perspective view of an exemplary embodiment of a device for monitoring the operation of a vibrating equipment.

FIG. 1a illustrates an exemplary embodiment of an energy harvester 1 for converting vibrational motion of a vibrating equipment 2. (see FIG. 2) into electrical energy. The energy harvester 1 comprises a pendulum 3 which is pivotably attached to the vibrating, equipment 2, a motion limiter 4 arranged to limit a pivoting motion of the pendulum 3 during movement of the vibrating equipment 2, and a generator 5 connected to the pendulum 3. The generator 5 is arranged to convert the pivoting motion of the pendulum 3 into electrical energy. The vibrational motion of the vibrating equipment 2 has an operating frequency, and the pendulum 3 has a natural frequency which differs from the operating frequency of the vibrating equipment 2. The motion limiter 4 is constituted by a first bar element 6 provided on one side of the pendulum 3 and a second bar element 7 provided on the other side of the pendulum 3. The energy harvester 1 has a first spring element 8 having a first and a second end 9, 10, and a second spring element 11 having a first and a second end 12, 13. The first end 9 of the first spring element 8 is attached to the pendulum 3 and the second end 10 of the first spring element 8 is arranged to rebound against the first bar element 6 during use of the energy harvester 1. The first end 12 of the second spring element 11 is attached to the pendulum 3 and the second end 13 of the second spring element 11 is arranged to rebound against the second bar element 7 during use of the energy harvester 1. The pendulum 3 comprises a rod 14 attached to a shaft 19. The pendulum 3 may or may not have a weight 15 attached to a lower end of the rod 14. The material and design of the pendulum 3 is chosen so that the frequency of the same is significantly higher than the operating frequency of the vibrating equipment 2. The pivot motion of the pendulum 3 is parallel with the vibrational motion of the vibrating equipment 2. In this embodiment, the shaft 19 is connected to a step drive constituting the generator 5. The rotation of the shaft 19 achieved by means of the pivot motion of the pendulum 3 will turn the step drive which in turn will produce electrical energy. The energy harvester 1 further comprises a microcontroller 16 for monitoring the operating condition of the energy harvester 1.

FIG. 1b illustrates the energy harvester 1 of FIG. 1a from a side view. The generator 5 is provided on a back side of the energy harvester 1 and is connected to the pendulum 3 through the shaft 19.

In FIG. 2, a device 17 for monitoring the operation of a screen 2 is illustrated. The device 17 comprises a sensor 18 for detecting a parameter of the screen 2, and an energy harvester 1 as illustrated in FIG. 1. The energy harvester 1 is connected to the sensor 18 and provides the same with electrical energy. The energy harvester 1 is adjustable in relation to the movement direction D of the screen 2. The energy harvester 1 may be physically rotated in order to align the angular peak-to-peak movement of the pendulum 3 with the angular peak-to-peak movement of the vibrating equipment 2.

When the vibrating equipment 2 is in use, the pendulum 3 starts to pivot. The pivoting motion is restricted by means of the first and second bar elements 6, 7, and the first and second spring elements 8, 11. This way, the pivoting motion of the pendulum 3 will be adjusted to always pivot at a frequency which corresponds to the frequency of the vibrational movement of the vibrating equipment 2 and not to the natural frequency of the pendulum 3. The pendulum 3 is in turn connected to the generator 5 in order to convert the pivoting motion of the same into electrical energy. In the exemplary embodiment described above, the generator 5 is constituted by a step drive. The shaft 19 of the pendulum 3 is connected to the step drive. The rotation of the shaft 19 achieved by means of the pivot motion of the pendulum 3 will turn the step drive thereby producing electrical energy.

The invention has mainly been described above with reference to a few embodiments. However, as is readily appreciated by a person skilled in the art, other embodiments than the ones disclosed above are equally possible within the scope of the invention defined by the appended claims.

For instance, the pendulum can be of any suitable shape and size, as long as its natural frequency differs from the operating frequency of the vibrational motion of the vibrating equipment. The same applies for the motion limiter and the possible at least one spring element.

Naturally, the generator may be of any suitable type such as, for example, a step drive or a linear actuator.

In another embodiment of the invention, the generator is constituted by a linear actuator. Here, the shaft comprises a gear wheel which is in engagement with a threaded shaft of the linear actuator. The rotation of the gear wheel achieved by means of the pivot motion of the pendulum will thus reciprocate the threaded shaft of the linear actuator, thereby producing electrical energy.

The energy harvester is useful with any vibrating equipment, and it is particularly suitable for use with equipment having a repetitive peak-to-peak movement which is greater than 0.2", such as screens or feeders, which as part of its intended function performs a vibrating, or reciprocating motion.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An energy harvester for conveying vibrational motion of a vibrating equipment into electrical energy, comprising:
   a pendulum pivotably attached to said vibrating equipment;
   a motion limiter arranged to limit a pivoting motion of said pendulum, said motion limiter including a first bar element spaced from a first side of the pendulum and a second bar element spaced from a second side of the pendulum;
   a first spring element having a first end attached to the pendulum and a second end positioned in contact with the first bar element to restrict the pivoting movement of the pendulum during the pivoting movement of the pendulum and to cause the pendulum to rebound from the first bar element;
   a second spring element having a first end attached to the pendulum and a second end positioned in contact with the second bar element to restrict the pivoting movement of the pendulum during the pivoting movement of the pendulum and to cause the pendulum to rebound from the second bar element; and
   a generator connected to said pendulum and arranged to convert said pivoting motion into electrical energy,
   said vibrational motion having an operating frequency, and said pendulum having a natural frequency different from said operating frequency.

2. An energy harvester according to claim 1, wherein said generator is a step drive.

3. An energy harvester according to claim 1, wherein said generator is a linear actuator.

4. An energy harvester according to claim 1, wherein said natural frequency of said pendulum is significantly higher than said operating frequency.

5. An energy harvester according to claim 1, wherein said pendulum comprises a rod attached to a shaft, and a weight provided at an end of said rod.

6. An energy harvester according to claim 1, wherein said energy harvester is a high g energy harvester.

7. An energy harvester according to claim 1, wherein said vibrating equipment is a screen or a feeder.

8. An energy harvester according to claim 1, further comprising a microcontroller for monitoring the operating condition of said energy harvester.

9. An energy harvester according to claim 1, wherein said pendulum is arranged to move parallel with said peak-to-peak vibrational motion of said vibrating equipment.

10. A device for monitoring the operation of a vibrating equipment, comprising:
    a sensor for detecting a parameter of said vibrating equipment;
    an energy harvester for conveying vibrational motion of a vibrating equipment into electrical energy;
    a pendulum pivotably attached to said vibrating equipment;
    a motion limiter arranged to limit a pivoting motion of said pendulum, said motion limiter including a first bar element spaced from a first side of the pendulum and a second bar element spaced from a second side of the pendulum;
    a first spring element having a first end attached to the pendulum and a second end positioned in contact with the first bar element to restrict the pivoting movement of the pendulum during the pivoting movement of the pendulum and to cause the pendulum to rebound from the first bar element;
    a second spring element having a first end attached to the pendulum and a second end positioned in contact with the second bar element to restrict the pivoting movement of the pendulum during the pivoting movement of the pendulum and to cause the pendulum to rebound from the second bar element; and
    a generator connected to said pendulum and arranged to convert said pivoting motion into electrical energy,
    said vibrational motion having an operating frequency, and said pendulum having a natural frequency different from said operating frequency.

11. A device according to claim 10, wherein said energy harvester is adjustable in relation to a movement of said vibrating equipment.

* * * * *